(12) United States Patent
Ludlam

(10) Patent No.: US 10,836,116 B2
(45) Date of Patent: Nov. 17, 2020

(54) SYSTEM AND METHOD FOR CREATING PHYSICAL OBJECTS USED WITH VIDEOGAMES

(71) Applicant: Activision Publishing, Inc., Santa Monica, CA (US)

(72) Inventor: Michael D. Ludlam, San Anselmo, CA (US)

(73) Assignee: Activision Publishing, Inc., Santa Monica, CA (US)

(*) Notice: Subject to any disclaimer, the term of this patent is extended or adjusted under 35 U.S.C. 154(b) by 68 days.

(21) Appl. No.: 15/630,514

(22) Filed: Jun. 22, 2017

(65) Prior Publication Data

US 2018/0370154 A1 Dec. 27, 2018

(51) Int. Cl.
| | |
|---|---|
| *A63F 13/80* | (2014.01) |
| *G05B 19/4099* | (2006.01) |
| *B29C 67/00* | (2017.01) |
| *G06F 3/02* | (2006.01) |
| *B29C 64/386* | (2017.01) |
| *B33Y 50/02* | (2015.01) |
| *A63F 13/235* | (2014.01) |

(52) U.S. Cl.
CPC ........ *B29C 67/0088* (2013.01); *B29C 64/386* (2017.08); *G06F 3/0227* (2013.01); *A63F 13/235* (2014.09); *B33Y 50/02* (2014.12)

(58) Field of Classification Search
CPC ......... G06T 13/40; G06T 13/00; G06T 17/20; G06T 17/00; G05B 19/4099
See application file for complete search history.

(56) References Cited

U.S. PATENT DOCUMENTS

| | | | |
|---|---|---|---|
| 9,123,175 B1* | 9/2015 | Goldenthal | G06T 13/40 |
| 2009/0018685 A1* | 1/2009 | Holzwarth | G06T 17/20 |
| | | | 700/98 |
| 2012/0019517 A1* | 1/2012 | Corazza | G06T 13/40 |
| | | | 345/419 |
| 2013/0176312 A1* | 7/2013 | Schouwenburg | G06K 15/025 |
| | | | 345/424 |
| 2014/0169659 A1* | 6/2014 | Lauer | G06T 19/20 |
| | | | 382/154 |
| 2015/0328839 A1* | 11/2015 | Willis | G05B 19/4099 |
| | | | 700/98 |
| 2017/0085733 A1* | 3/2017 | Ilic | G06T 19/20 |
| 2017/0124726 A1* | 5/2017 | Soulard | B33Y 50/02 |
| 2018/0046167 A1* | 2/2018 | Iverson | G06T 7/73 |

* cited by examiner

*Primary Examiner* — Omkar A Deodhar
*Assistant Examiner* — Ross A Williams
(74) *Attorney, Agent, or Firm* — Klein, O'Neill & Singh, LLP

(57) ABSTRACT

A user may create a customized virtual game character and the customized virtual game character may be physically substantiated. In some embodiments the virtual game character is physically substantiated by making a toy in the form of the virtual game character, which in some embodiments has computer readable information regarding the virtual game character. In some embodiments the toy is made by way of 3-D printing. In various embodiments portions of the toy which may be considered too thin for 3-D printing are expanded. In some embodiments internal ambient occlusion information is used in determining if a portion is too thin.

12 Claims, 8 Drawing Sheets

SYSTEM AND METHOD FOR CREATING PHYSICAL OBJECTS USED WITH VIDEOGAMES

BACKGROUND OF THE INVENTION

The present invention relates generally to the creation and customization of videogame objects and to the physical substantiation of those videogame objects.

Videogames are enjoyed by many people. Videogames allow videogame players to participate in a variety of simulated activities. They also allow videogame players to perform roles and experience activities that the game players may not be able or desire to experience directly, whether due to cost, danger, or equipment concerns, or simply due to a role or activity being a fantasy.

Because videogames are generally provided by way of an electronic device (e.g., a game console) and a display (e.g., a television screen), they often lack a physical component by which videogame players may physically interact with the videogame's virtual world and the virtual objects within. Despite the audiovisual improvements achieved by videogames in recent times, game play experience largely remains two dimensional. Merely interacting with a displayed simulated environment may not allow videogame players to fully relate or connect to game play, with a sharply distinct separation between a virtual world and the world physically inhabited by the videogame players.

Some videogames make use of pre-packaged toys that may be representative of videogame objects (e.g., characters, items, weapons, vehicles, buildings, etc.), adding a "real-world" element to videogame play. However, players may not be able to easily modify such pre-packaged toys to reflect in-game customizations made to their corresponding objects. In addition, videogames may allow players to create their own custom virtual objects, but players may not be able to readily bring these custom virtual objects into the real world. Moreover, the custom virtual objects may include features that may be difficult to realize in a physical toy.

BRIEF SUMMARY OF THE INVENTION

Some embodiments in accordance with aspects of the invention provide a method, performed using at least one processor, useful in creation of a physical substantiation of a videogame character, comprising: receiving a plurality of selections relating to a visual appearance of a videogame character; creating, by the at least one processor, a virtual model of a virtual game character using the plurality of selections relating to the visual appearance of the videogame character; determining that a representation of the virtual model includes portions with a width below a predetermined minimum width; and increasing the width of those portions of the virtual model with a width below the predetermined minimum width.

In some embodiments the model of the virtual game character includes a virtual mesh defining an outer surface of the virtual game character, a rig defining bones of the virtual game character, with animations defined for animating the rig, and wherein the representation of the model includes information of the mesh defining the outer surface of the virtual game character, but not the rig or animations.

In some embodiments determining that the representation of the model includes portions with a width below the predetermined minimum width comprises: determining internal ambient occlusion for the representation of the model; and for each of at least a plurality of surfaces of the representation of the model, comparing an indication of the internal ambient occlusion with a value indicative of the predetermined minimum width.

In some embodiments the invention provide a system for use in creating a toy representative of a videogame character, comprising: a server configured by program instructions to: receive a plurality of selections relating to a visual appearance of a videogame character; create a virtual model of a virtual game character using the plurality of selections relating to the visual appearance of the videogame character; determine that a representation of the virtual model includes portions with a width below a predetermined minimum width; and increase the width of those portions of the representation of the virtual model with a width below the predetermined minimum width.

In some embodiments the invention provide the program instructions for determining that the representation of the model includes portions with a width below the predetermined minimum width comprises program instruction to: determine internal ambient occlusion for the representation of the model; and for each of at least a plurality of surfaces of the representation of the model, compare an indication of the internal ambient occlusion with a value indicative of the predetermined minimum width.

In some embodiments the program instructions for increasing the width of those portions of the model with a width below the predetermined minimum width comprises program instructions to displace vertices of a mesh forming the representation of the model normal to an outer surface of the model.

These and other aspects of the invention are more fully comprehended upon review of this disclosure.

DETAILED DESCRIPTION

Figure 1:
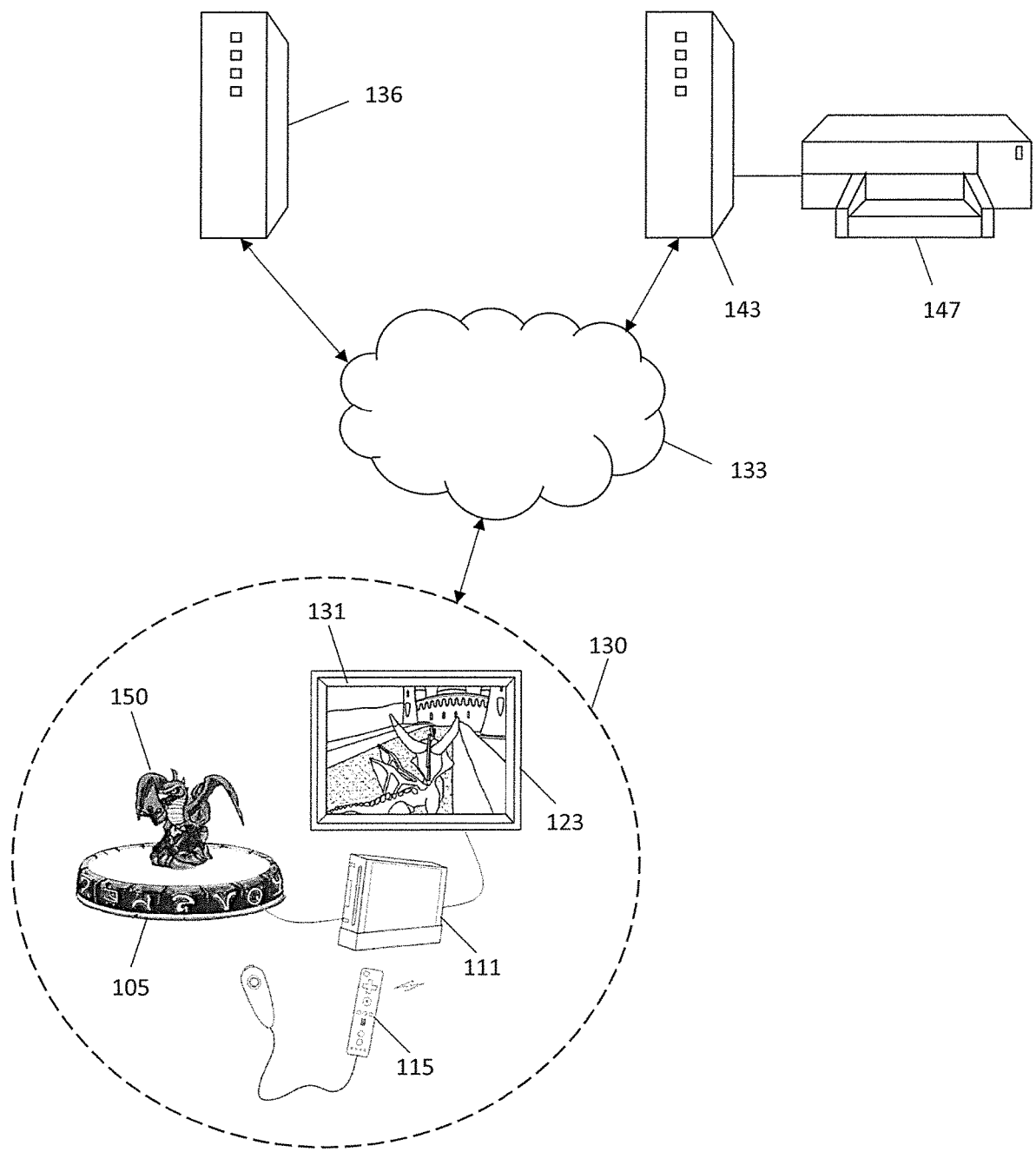
FIG. 1 is semi-block diagram of a system in accordance with aspects of the invention.

Aspects of the invention relate to providing a physical representation or "substantiation" of an in-game virtual object for a videogame, the virtual object being generated by a game player using a game device.

In some embodiments the game player selects a plurality of visual features of a game object, for example a game character. Using the selected visual features, a virtual representation of the game character is generated, with the virtual representation including a mesh used for rendering of the game character during game play, along with associated rigging, skinning, animations, RGB textures, etc. for display of the game character during game play. The virtual representation, or portions of the virtual representation (for example the mesh and RGB textures), are used to generate information of a three dimensional representation of the game character. The three dimensional representation, however, may not be suitable for physical substantiation, for example using a 3-D printer. Accordingly, in various embodiments, the information of the three dimensional representation may be modified to allow for, or increase the ease of, forming a physical substantiation of the game character. In some embodiments, portions of the three dimensional representation having a thickness below a predefined thickness are increased in cross-section so as to have a thickness above the predefined thickness. In some embodiments the modified information of the three dimensional representation is used to 3-D print a physical embodiment of the game character.

In some embodiments a game device receives the game player selections for the visual features, for example by way of user inputs from a game controller. In some embodiments the game device generates the virtual representation of the game character, and in some embodiments the game device generates the information of the three dimensional representation of the game character, and modifies the information of the three dimensional representation to allow for increased ease in forming the three dimensional representation. In some embodiments the game device transmits information of the selections over a network to a server, and the server generates the virtual representation of the game character, generates the information of the three dimensional representation of the game character, and modifies the information of the three dimensional representation to allow for increased ease in forming the three dimensional representation.

The plurality of visual features may include one, some, or all of body parts of the game character, apparel of the game character, ornamentation for the game character, and accessories for the game character. In some embodiments for each of the body parts, apparel, ornamentation, and accessories, the game player may be presented a plurality of selections to choose from, which may provide for a vast range of options for a resulting game character.

In some embodiments thickness of portions of the three dimensional representation is determined using information regarding internal ambient occlusion of the three dimensional representation. In some embodiments portions of the three dimensional representation having a thickness below a predefined thickness are uniformly increased in cross-sectional width by equal amounts.

As used herein, the term "in-game object" (alternatively, "videogame object," "game object," or "object") includes any in-game element of a videogame, including for example characters, items, weapons, vehicles, buildings, environmental elements, and the like. In some embodiments, the game object is a videogame character controlled by a game play during play of a videogame. In some embodiments, a game player may create a game object for use in a videogame, for example through the selection of choices for a plurality of options relating to aspects of the game object. In such embodiments, the game device may present the user with choices for selection for each of a plurality of options, with the game receiving the selections and storing the selections as defining the game object. The options may relate to visual attributes of the game object, for example, shape, size, and other physical features of the game object, as well as ornamentation (e.g., clothing, jewelry, paint jobs, skins, decorations, etc.) for the game object. The options may also relate to non-visual attributes of the game object, for example the game object's name, catch phrase, class, element type, hit points, stamina, strength, agility, intelligence, speed, durability, spells, capabilities, and powers within play of the videogame. The selections, therefore, may define the visual and non-visual attributes of the game object. The visual attributes of the game object may define some and/or all aspects of a two- and/or three-dimensional representation of the game object.

In some embodiments, the videogame will present to the game player only a subset of possible choices and options for creating and customizing a game object, with other choices and options being made available only after certain conditions have been met. New options and choices may be made available to the game player in a number of ways, including without limitation, based on the game player's progress and achievements within game play, based on the physical toys obtained by the game player and used within the videogame, or based on events defined by the videogame manufacturer (or publisher or distributor). Game players may also purchase access to new options, either through a digital transaction, a physical intermediary such as a gift card for digital transactions, or a physical purchase such as a toy, card or other item. In some embodiments, the player may not know exactly which option(s) he has acquired until he has paid for it and/or redeemed it within the game.

According to aspects of the invention, the game device may also communicate information relating to the game object to a physical substantiation device. The physical substantiation device may be directly coupled to the game device or indirectly coupled through one or more devices on a computer network. The physical substantiation device is capable of creating a physical substantiation of, or relating to, the game object. Additionally or alternatively, the physical substantiation device may be 3-D printer device, for example a printer that lays down successive layers of material to create a physical object. The 3-D printer may form a physical object or toy that resembles or relates to the game object, though in some embodiments, the physical object may be generic and not representative of the game object (e.g., a treasure chest, gem, stone, trinket, etc.). Other devices or processes may be used to physically substantiate the game object, for example known toy molding and manufacturing processes.

In some embodiments, the physical substantiation of the game object includes a machine-readable/writeable storage component. In such embodiments, the game device or physical substantiation device may write information relating to the game object to the machine-readable/writeable storage component. In some embodiments, the physical substantiation of the game object may include a cavity, recess, cutout, or other volume to receive the machine-readable/writeable storage component.

According to aspects of the invention, the information relating to the game object may include any information relevant to the game object, including for example, a unique identifier associated with the game object, a unique identifier associated with a creation vessel storing information relating to the game object, and information relating to the game object's attributes. In some embodiments, the information relating to the game object is sufficient to define all aspects of the game object. Alternatively, the information relating to the game object may only be sufficient to define one or more portions of the game object, with information relating to the undefined portions coming from a separate source.

According to aspects of the invention, the physical substantiation of the game object may be used for videogame play. For example, upon detecting a physical substantiation of the game object (e.g., a toy embodying the game object), the game device can read information relating to the game object stored in the physical substantiation's storage component and use that information to provide for videogame play including the game object.

FIG. 1 illustrates an embodiment of a system in accordance with aspects of the invention. The system includes a videogame system 130. The videogame system may be coupled to a network 133, which may be for example the Internet. Also coupled to the network are a first server 136 (or a plurality of servers) and a second server 143. As shown in FIG. 1, a physical substantiation device 147 is coupled to the second server, either directly or through a local wired or wireless network, though in some embodiments the physical substantiation device made be directly coupled to game device 111. The physical substantiation device may be a 3-D printer, for example for creating physical objects through laying down successive layers of material to create an object or structure, or any other device or process suitable for producing physical substantiations of the game object.

The videogame system includes a game device. In FIG. 1 the game device is shown as game console 111. In various embodiments the game device may instead be another computer device, for example a tablet computer, a smartphone, a laptop computer, a personal computer, smart television, or any other computer device suitable for playing videogames. The game console has a processor and associated circuitry for executing program instructions for providing game play and, as discussed herein, for creating game objects and, in some embodiments, for commanding physical substantiation of game objects. The instructions providing for game play may be stored on removable media, for example, an optical disk, or may be stored on the game console's non-removable storage. Accordingly, the game device may include an optical drive, for example, a DVD-ROM, CD-ROM, Blu-ray drive, or hard drive for reading the instructions for game play. Also as illustrated in FIG. 1, the videogame system includes user input devices such as a game controller 115, a display device 123 for displaying game action, and a peripheral device 105, which includes circuitry for reading information from, and in some embodiments writing information to, another object. A toy 150, which in various embodiments includes a rewritable memory, is shown as placed upon the peripheral device, for example so that the peripheral information may read information of the toy. In the embodiment of FIG. 1, the toy physically resembles a videogame character created by a game player.

In some embodiments, the game device may provide for game play by presenting a videogame object in a virtual world. Control of the videogame object in the virtual world may be based on user inputs, for example, provided by the game controller. For example, the processor, responsive to inputs from the user input devices and the peripheral device 105, generally commands display on the display device 123 of a game object in and interacting with a virtual world of game play and possibly each other. In addition, the processor, responsive to inputs from the peripheral device 105, for example inputs based on information read from the physical object or toy, may be used to add objects, for example the game character represented by the physical object or toy, to the virtual world, with the character able to move about the virtual world.

The display device 123 is generally coupled to the game device by a cable, although in some embodiments a wireless connection may be used. In many embodiments, the display device is a liquid crystal display. In some embodiments, the display device is a television. In some embodiments, the display device is a cathode ray display, a plasma display, an electroluminescent display, an LED or OLED display, or other display. In yet other embodiments, the display device may be integrated with the game device (e.g., a tablet, smartphone, or smart television). A display screen 131 of the display device 123 displays video images of game play, generally as commanded by the processor or other associated circuitry of the gaming platform. In the embodiment of FIG. 1, the display screen shows a screenshot of game play. As illustrated, the screenshot shows a display of a game character, for example a game character represented by the toy 150, generally controlled by and animated in accordance with user inputs.

In addition, the game device allows a game player to create or customize a game object for use in the videogame, for example through selection of choices for a plurality of options relating to aspects of the game object. The game device may present the user choices for selection for each of a plurality of options, with the game receiving the selections and storing the selections as defining the game object. The options may relate to visual attributes of the game object, for example, shape, size, and other physical features of the game object, as well as ornamentation (e.g., clothing, jewelry, paint jobs, skins, decorations, etc.) and accessories (e.g. weapons) for the game object. The options may in addition also relate to non-visual attributes of the game object, for example the game object's name, catch phrase, class, element type, hit points, stamina, strength, agility, intelligence, speed, durability, spells, capabilities, and powers within play of the videogame. The selections, therefore, may define the visual and non-visual attributes of the game object.

In some embodiments the game device may enable or allow the game player to select a predefined game object, for example through selection of choices for a plurality of predefined game objects, with each of the plurality of predefined game objects having predefined visual and/or non-visual attributes, but still allowing for further customizations by the game player.

In some embodiments the game device generates information for rendering the game object, based on the selected options for the game object, poses the game object in a predetermined pose, for example in accordance with an animation defined for a rig associated with the game object, modifies information regarding a three dimensional representation of the game object such that all portions of the game object have at least a predetermined thickness, and transmits information regarding a three dimensional representation of the game object to a server for use in physically substantiating the game object. In many embodiments, however, information of the selected options is transmitted to the server, and the server so processes the information.

The game device may also communicate information relating to the game object to physical substantiation device 147. The physical substantiation device may be directly coupled to the game device or indirectly coupled through a computer network (e.g., the Internet). The physical substantiation device is capable of creating a physical substantiation of, or relating to, the game object. For example, the physical substantiation device may be 3-D printer device, for example a printer that lays down successive layers of material to create a physical object. Non-limiting examples of 3-D printing processes include stereolithography, digital light processing, laser sintering, selective deposition lamination, inkjet, and extrusion. The 3-D printer may form a physical object or toy that resembles or relates to the game object. Other devices or processes may be used to physically substantiate the game object, for example known toy molding and manufacturing processes.

In some embodiments, the physical substantiation of the game object includes a machine-readable/writeable storage component, examples of which include radio-frequency identification (RFID) tags, near-field communication (NFC) tags, flash memory drives, solid-state memory drives, and the like. In such embodiments, the game device or physical substantiation device may write information relating to the game object to the machine-readable/writeable storage component. In some embodiments, the physical substantiation of the game object may include a cavity, recess, cutout, or other volume to receive the machine-readable storage component.

In some embodiments, and as illustrated in FIG. 1, the game device communicates the information relating to the game object to the second server 143, with the second server coupled to the physical substantiation device. In some embodiments, the transmitted information relating to the game object defines a physical representation of the game object. In some embodiments, the transmitted information of the game object provides sufficient information to identify components of a physical representation of the game object. For example, if the game object is a game character, the transmitted information may be identification information that identifies visual and/or geometric aspects of different portions of the game character. In some embodiments, the identification information may be used to access information stored by the second server that defines the physical representation of the game object. In some embodiments, the identification information may be used by the second server to request information from another server, for example first server 136, which defines the physical representation of the game object.

Figure 2:
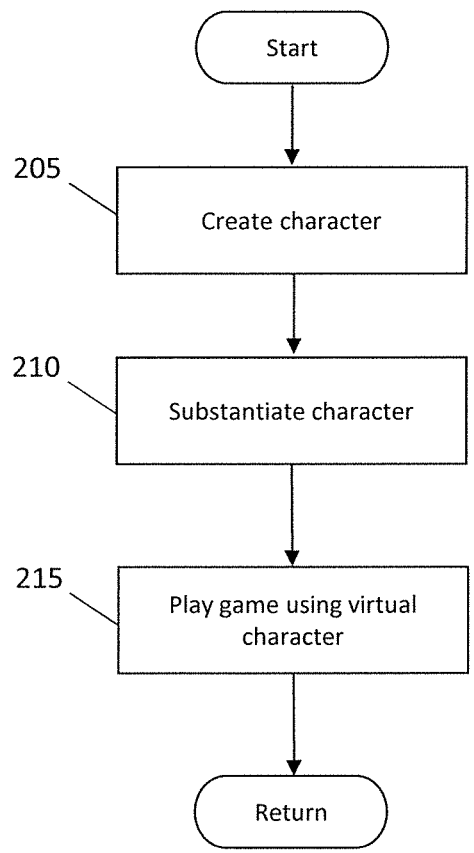
FIG. 2 is a flow diagram of a process in accordance with aspects of the invention.

FIG. 2 is a flowchart of a process in accordance with aspects of the invention. In some embodiments the process is performed by the system of FIG. 1. In some embodiments portions of the process are performed by, or with assistance of, a game player computer, a computer coupled to a physical substantiation device, a game object information server, and/or one or more processors of such computers or servers. In some embodiments the processors execute program instructions in performing the process.

In block 205 the process creates a videogame object. In some embodiments the process creates an object by presenting selectable options regarding attributes of a game object to a game player, and receives selections from those options input by the game player. In some embodiments the options are presented on a display of a game device. In some embodiments the selections are received by way of user inputs to the game device, for example by way of operation of a game controller.

In block 210 the process physically substantiates the created videogame object. The process may substantiate the created game object using a physical substantiation device as discussed above and throughout. Also as discussed above and throughout, the physical substantiation of the object may include one or more storage components storing information relating to the object and/or a unique identifier associated with the physical substantiation of the object.

In block 215 the process provides for game play of a videogame utilizing the created game object. In some embodiments, the process reads the information relating to the object from the physical substantiation's one or more storage components and uses the information to present the game object in the videogame. In some embodiments such is performed, for example, as discussed in U.S. patent application Ser. No. 13/109,956, filed May 17, 2011, entitled "Video Game With Concurrent Processing of Game-Related Objects," the disclosure of which is incorporated by reference for all purposes. Additionally or alternatively, the process reads the unique identifier associated with the physical substantiation of the object and uses it to retrieve information relating to the game object and present the object in the videogame. In some embodiments such is performed, for example, as discussed in U.S. patent application Ser. No. 13/461,508, filed May 1, 2012, entitled "Server Based Interactive Video Game With Toys," the disclosure of which is incorporated by reference for all purposes.

The process thereafter returns.

Figure 3:
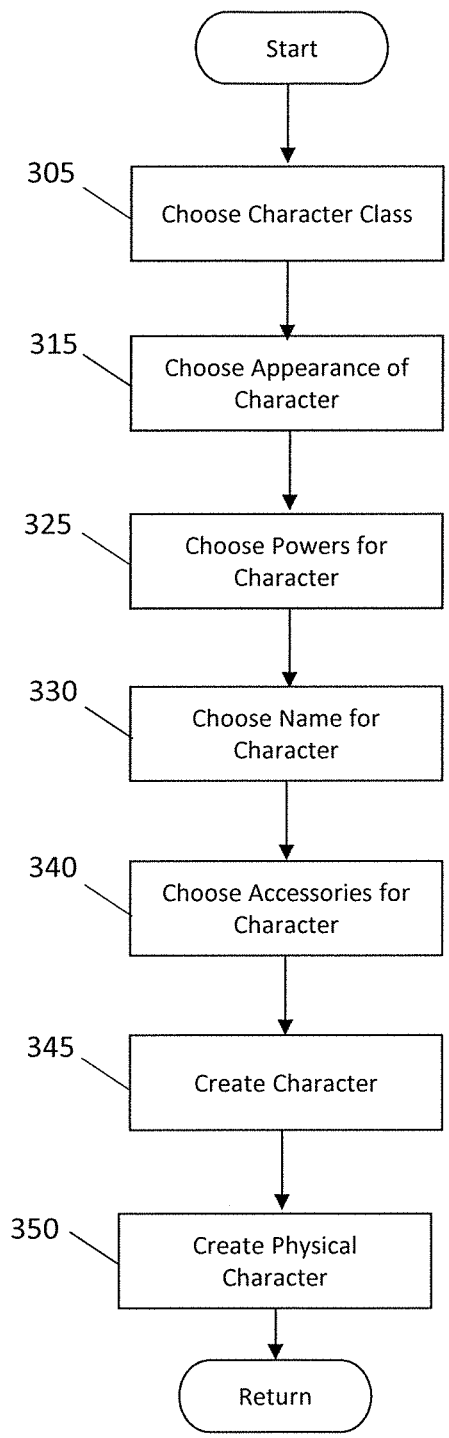
FIG. 3 is a flow diagram of a process of creating a videogame character in accordance with aspects of the invention.

FIG. 3 is a further flow diagram of a process of creating a videogame object in accordance with aspects of the invention. In some embodiments the process may be performed as part of a process for creating a game object and physically substantiating the game object such as the process performed in block 205 and 210 of FIG. 2. In addition, the process may be performed by a game device, for example the game console 111 of FIG. 1, responsive to inputs from user input devices, for example the game controller 115 of FIG. 1, and the process may be performed by one or more processor configured by program instructions. In some embodiments the process of FIG. 3 performs operations of block 205 and 210 of the process of FIG. 2.

In block 305, the process receives a selection of an object class. In various embodiments the object class may be a character class. In some embodiments the selection is provided by a user input device, operated by a game player, of the game device. In some embodiments, the object class may correspond to an element such as magic, tech, earth, air, fire, water, life, light, dark, or undead. In some embodiments different proportions, animations, or weapons may be associated with different object classes. Each game object may associate with at least one object class (e.g., at least one of the elements) which affects the object's abilities and/or powers in game play.

In block 315, the process receives selections of visual attributes for a game object. In some embodiments, for example where the game object is a character, the visual attributes may include a head, arms, legs, a torso, wings, a tail, scales, and/or colors of the game character. The head, arms, legs, torso, wings, tail, and scales may be of various shapes and sizes.

In block 325, the process receives selections of powers for the game object. Powers in some embodiments may include primary and/or secondary powers. Primary powers, for example, may include shocking enemies with bolts of lightning or spinning using wings and a tail to damage enemies. Secondary power in some embodiments may include dashing in various directions in shadow form or digging underground to avoid attacks.

In block 330, the process receives a selection of a name for the game object. The name in general may be any combination of characters although the name may have a character length limit. In some embodiments, the name may comprise only alphabet letters although in other embodiments, the name may include alphanumeric characters and/ or symbols. In some embodiments, rules and/or filters may be applied to prevent the use of foul or offensive language in the name-generation process.

In block 340, the process receives selections of accessories for the game object. The game object for example may possess accessories as part of the videogame play. The accessories may include weapon, clothing items, hat, shield, armor, and shoes. In some embodiments the accessories may be considered to include ornamentation which may include jewelry and/or body art.

In block 345, the process creates the customized object. The process for example may generate a game object in accordance with the chosen or selected visual attributes, powers, name, catch phrase, and/or accessories.

In block 350, the process creates a physical representation of the customized object.

The process thereafter returns.

Figure 4:
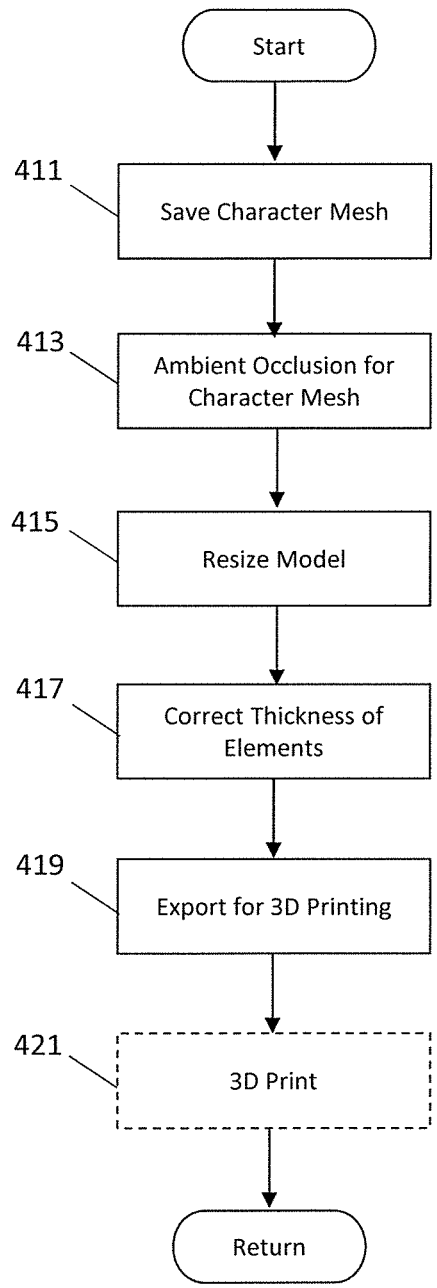
FIG. 4 is flow diagram of a process for creating a substantiation of the videogame character in accordance with aspects of the invention.

FIG. 4 is a flow diagram of a process generating information for use in forming a physical substantiation of a game object, and, in some embodiments, forming the physical substantiation of the game object. In some embodiments the process is performed by the system of FIG. 1. In some embodiments the process is performed by the game device and 3-D printer of FIG. 1. In some embodiments the process is performed by the game device and a server of FIG. 1. In some embodiments the process is performed by a server of FIG. 1. In some embodiments the process is performed by a server and the 3-D printer of FIG. 1. In some embodiments the process may be performed as part of a process for substantiating a game object such as the process performed in block 210 of FIG. 2 or block 350 of FIG. 3.

In block 411 the process saves a mesh defining a three dimensional representation of a game object, for example a game character, with the game character in a predefined pose. In some embodiments the mesh is of a representation of a game character suitable for rendering and animation, with the representation of the game character including associated animation rigs and skins. Accordingly, in some embodiments, the mesh is extracted from the representation of the game character, or, alternatively, the non-mesh elements of the representation of the game character may be removed or deleted.

In block 413 the process determines ambient occlusion and RGB texture for the mesh, and the mesh with ambient occlusion and RGB texture may be considered a model of the game object. In some embodiments the ambient occlusion and RGB texture information for the mesh is retained in the operations of block 411, and the operations of block 413 may be omitted.

In block 415 the process resizes the model, for example such that the model, if in physical form, will fit within a predefined envelope. In some embodiments the predefined envelope is in the shape of a cube. In some embodiments the predefined envelope is in the shape of a parallelpiped. In some embodiments the predefined envelope is in the shape of a cylinder. In some embodiments the predefined envelope is in the shape of a cylinder with a hemispherical top.

In block 417 the process corrects thickness of portions of the model that may be too thin for 3-D printing operations. In some embodiments the process determines thickness of portions of the model, compares the thicknesses to a predetermined thickness, and increases thickness of the portions if the thicknesses are less than the predetermined thickness. In some embodiments the process increases thickness of the portions in response to determining that the thickness is less than the predetermined thickness. In some embodiments the process determines thickness of portions of the model based on internal ambient occlusion of interior surfaces of the model. In some embodiments the process increases thickness by increasing a cross-section of portions determined to have a thickness less than the predetermined thickness. In some embodiments the process increases thickness by inflating portions determined to have a thickness less than the predetermined thickness. In some embodiments portions are inflated by displacing vertices of a mesh of the model in a direction generally normal to an outer surface of the model.

Figure 5A:
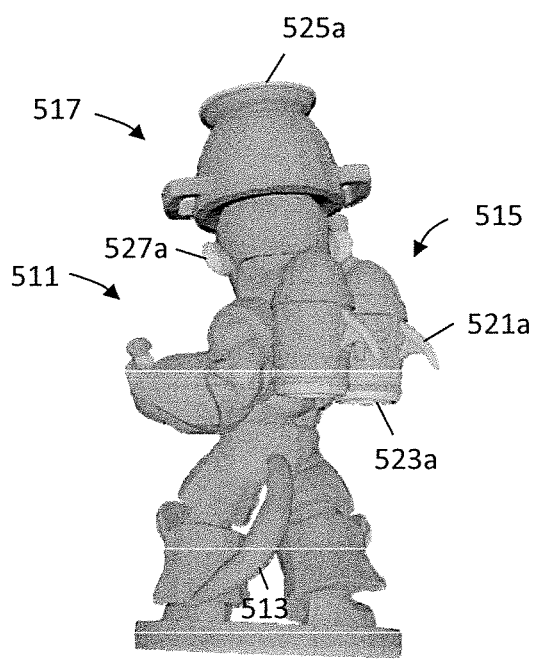
FIG. 5A illustrates an example of a model of a videogame character in accordance with aspects of the invention, with the model including portions possibly too thin for 3-D printing.

FIG. 5A illustrates a model, prior to correction. The model is a semi-rear view of a game character. The game character has a generally humanoid body 511, but additionally has a tail 513. The game character is adorned with a jet pack 515 and a helmet 517. Unfortunately, the model has portions which may be too thin for printing with a 3-D printer. For example, a portion of an ear 527a, an upper rim 525a of the helmet, a lower rim 523a of the jet pack, and a fin 521a of the jet pack all may be too thin for printing with a 3-D printer.

Figure 5B:
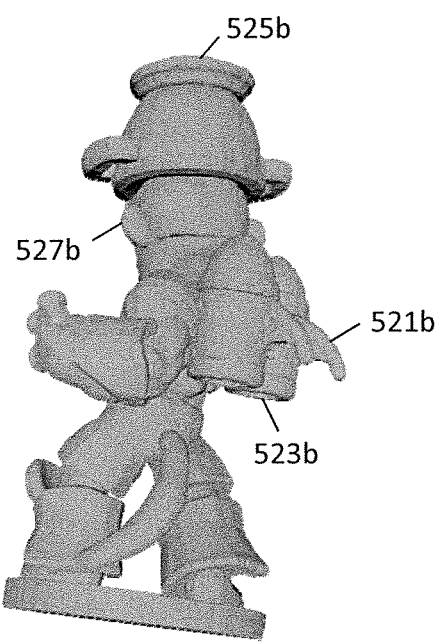
FIG. 5B illustrates the example of a corrected model of the videogame character of FIG. 5A, after thickness correction in accordance with aspects of the invention.

FIG. 5B illustrates the model of FIG. 5A, after correction. The corrected model of FIG. 5B includes an expanded upper rim 525b of the helmet, an expanded lower rim 525b of the jet pack, a thicker fin 521b of the jet pack, and a larger portion of the ear 527b. In some embodiments the expanded, thicker, or larger portions may be considered as of increased size, or inflated. In some embodiments the inflated portions may be considered as having a cross-sectional width increased, for cross-sectional widths below a predetermined length.

Returning to discussion of FIG. 4, in block 419 the process exports the corrected model for 3D printing. In some embodiments the process also changes format of data of the model to a format useable for 3D printing.

In optional block 421, after which the process returns, the process 3-D prints the model, forming a physical substantiation of the game object. The physical substantiation of the game object or simply the physical object or toy may resemble the game object and have visual attributes of the game object. For example, the game object may be a game character with an appearance the same as or similar to the model of FIG. 5B, or in some embodiments the model of FIG. 5A. In some embodiments, non-visual attributes may be reflected as well. For example, with respect to toy 210, the game object's non-visual attributes such as character class or element type may affect the color of a toy's pedestal or base. In some embodiments the toy 210 may be, or include features, as discussed in U.S. patent application Ser. No. 13/335,737, filed Dec. 22, 2011, entitled "Interactive Video Game With Visual Lighting Effects" and/or U.S. patent application Ser. No. 13/359,361, filed Jan. 26, 2012, entitled "Interactive Video Game With Toys Having Special Effects," the disclosures of both of which are incorporated herein by reference for all purposes. As discussed herein, the physical object or toy may include a machine-readable/writable storage component storing information relating to the game object. The information stored in the machine-readable/writable storage component may be sensed, read, and/or written by a peripheral device, for example the peripheral device 105 and/or a game device, for example the game console 111 of FIG. 1, coupled directly or indirectly to the storage component. The machine-readable/writable information may include information of the visual and non-visual attributes of the game character.

The physical substantiation of the game object may be linked to the game object by associating the information relating to the physical substantiation (e.g., a unique identifier of the physical substantiation) with information relating to the game object, and storing said association in the game device and/or a server. The stored information may, in some embodiments, be accessed across multiple platforms (e.g., different game consoles, game devices, and computer devices) and applications (e.g., videogames, companion apps, online stores, social media applications, websites, etc.).

Figure 6:
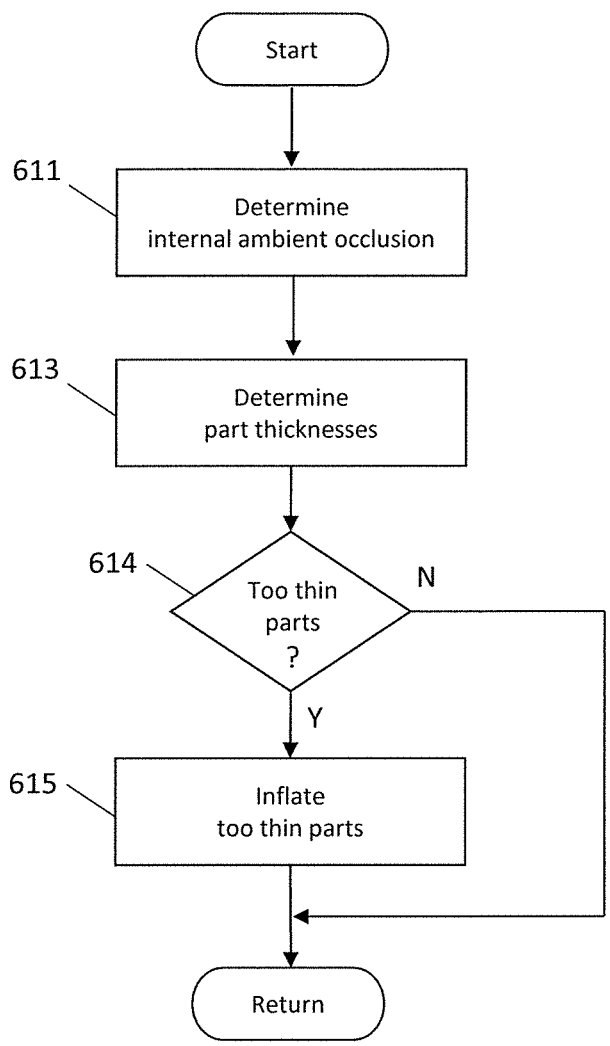
FIG. 6 is flow diagram of a further process for creating a corrected substantiation of the videogame character in accordance with aspects of the invention.

FIG. 6 is a flow diagram of a process for use in correcting a model to allow for 3-D printing, in accordance with aspects of the invention. In some embodiments the process is performed by the system of FIG. 1. In some embodiments the process is performed by the game device of FIG. 1. In some embodiments the process is performed by the game device and a server of FIG. 1. In some embodiments the process is performed by a server of FIG. 1. In some embodiments the process may be performed as part of operations of block 210 of the process of FIG. 2, as part of operations of block 350 of the process of FIG. 3, or as all or part of the operations of block 417 of the process of FIG. 4.

In block 611 the process determines internal ambient occlusion for a representation of a three dimensional character. In some embodiments internal ambient occlusion is performed using ray tracing from points along a surface of the representation of the three dimensional character, with the rays directed into the representation of the three dimensional character. In some embodiments the ray tracing is performed for rays directed into the representation of the three dimensional character, and normal to the surface of the representation.

In block 613 the process determines thickness of portions of the representation of the three dimensional character. In some embodiments the thickness is determined using the internal ambient occlusion for the representation of the three dimensional character. In some embodiments the thickness is proportional to an inverse of the determined internal ambient occlusion. In some embodiments the thickness is proportional to an inverse of the determined internal ambient occlusion.

In block 614 the process determines if the representation of the three dimensional character includes portions that are too thin. In some embodiments a portion is considered too thin if the portion has a thickness less than a predetermined thickness. In some embodiments the predetermined thickness is a minimum thickness, or a believed minimum thickness, for 3-D printing.

In some embodiments the operations of blocks 611-614 may be effectively performed by determining internal ambient occlusion with a maximum ray length (or maximum distance for determining ambient occlusion) set to a predetermined value, equal to or greater than a value indicative of a minimum thickness, and determining if a resulting value indicative of internal ambient occlusion indicates a thickness less than the minimum thickness. In some embodiments the predetermined value is a value equal to the value indicative of minimum thickness. In such embodiments, a point on a surface of the representation of the three dimensional character has a thickness greater than the minimum thickness if the resulting value indicative of internal ambient occlusion indicates no occlusion. In addition, in various embodiments, the magnitude of internal ambient occlusion also indicates to what extent the thickness is too thin, e.g. to what extent the representation of the three dimensional character is at a particular point.

In some embodiments internal ambient occlusion for the representation is rendered, or as may be commonly termed "baked", with results saved as a texture map in two-dimensional, or UV coordinates. In such an embodiment, each vertex of polygons making up the representation has a UV coordinate, and the resulting value indicative of internal ambient occlusion may be checked to determine if the internal ambient occlusion at that point indicates the representation is too thin.

Figure 7:
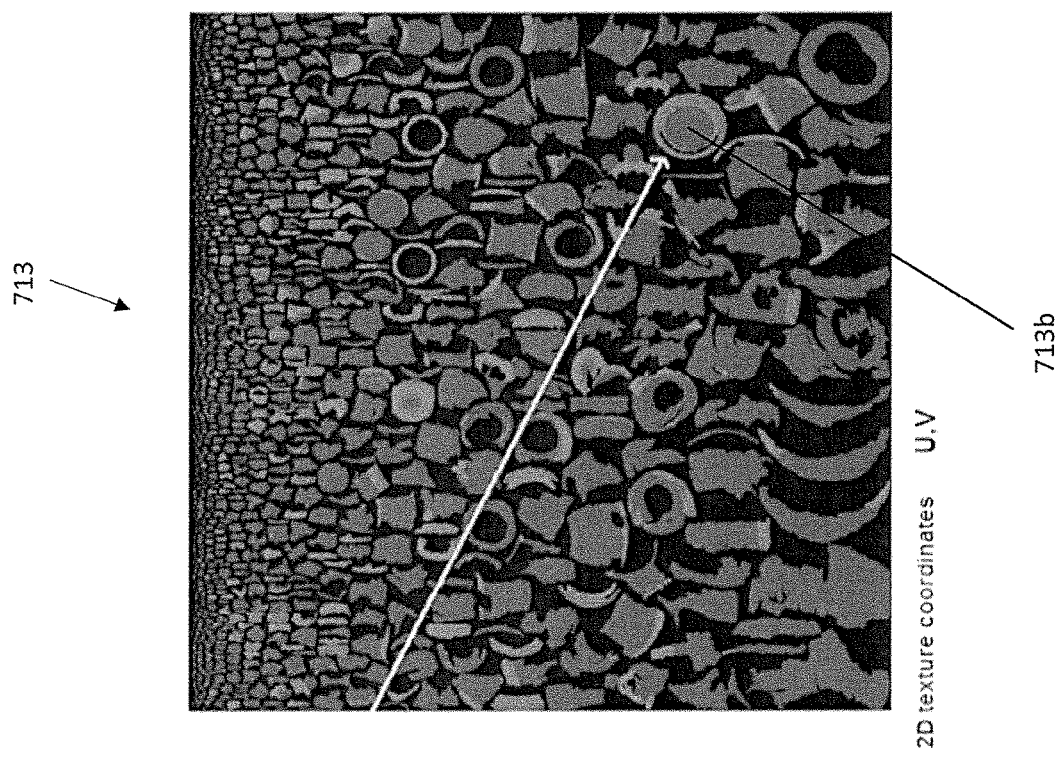
FIG. 7 illustrates a model of a videogame character and an associated texture map reflecting internal ambient occlusion for that character.
Figure 7:
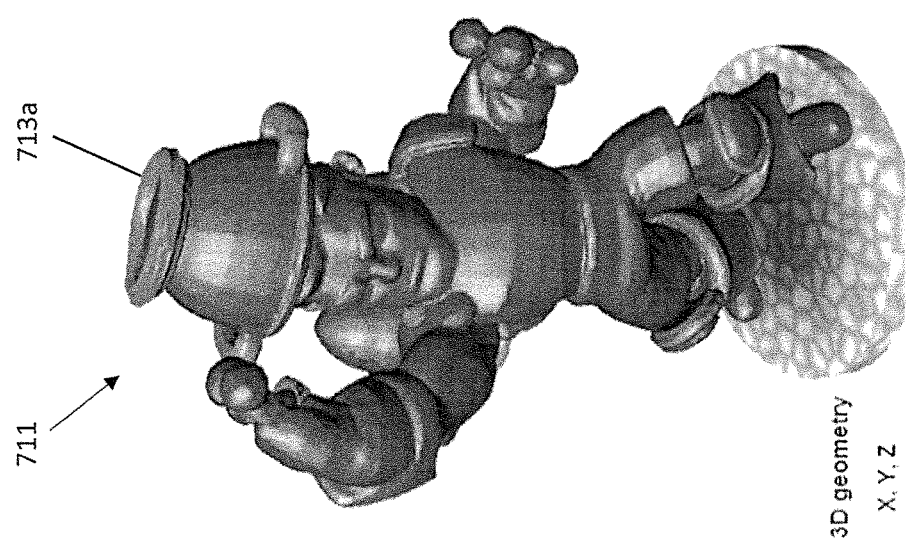

FIG. 7 illustrates a model of a videogame character 711, similar to the model of FIG. 5A, and a UV texture map 713 for that model. The texture map indicates portions of the model that are too thin, with portions too thin shown as a different shade in the illustration of the texture map. For example, the model includes helmet with an upper rim 713a for the videogame character. As indicated in the texture map, portions of the texture corresponding to the upper rim are too thin.

If the representation of the three dimensional character includes portions that are too thin, the process proceeds to block 615. Otherwise the process returns.

In block 615 the process increases widths of the portions that are too thin. In some embodiments, the process increases cross-sectional widths of the portions that are considered too thin. In some embodiments the process inflates the portions that are considered too thin. In some embodiments the process increases the widths of the portions that are considered too thin by a scaling factor. In some embodiments the scaling factor is determined by dividing a predefined minimum width by a value indicative of a width of the portion considered too thin. In some embodiments the representation of the three dimensional character is defined by a polygonal mesh, with for example adjacent polygons of the mesh sharing at least some common vertices, or having boundaries that include vertices of adjacent polygons. In such embodiments, the process may increase widths of the portions that are too thin by displacing vertices of the polygonal mesh for these portions in a direction of an average geometric vertex normal. In some embodiments the average geometric vertex normal is an average of the surface normal for the polygons sharing that vertex. In some embodiments the displacement is equal to an amount expected to result in the portion no longer being too thin.

Figure 8:
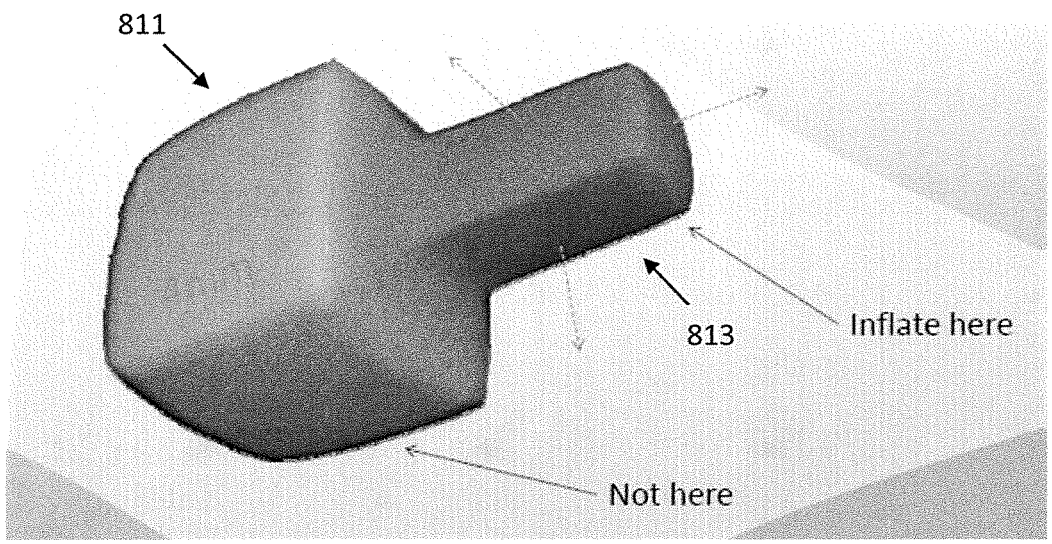
FIG. 8 illustrates a part for which correction is utilized in accordance with aspects of the invention.

FIG. 8 illustrates an example representation of a three dimensional object having a portion considered too thin. The object includes a generally cube shaped portion 811. A generally parallelpiped portion 813 extends outward from roughly a center of one of the faces, a first face, of the cube shaped portion. A length, or height of the parallelpiped portion is approximately a height of the cube shaped portion. However, cross-sectional widths of the parallelpiped portion, for cross-sections roughly in the same plane as the first face of the cube shaped portion, is approximately half that of similar cross-sectional widths of the cube shaped portion.

Considering the operations of block 615 with respect to the example representation of FIG. 8, the parallelpiped portion may be considered too thin, while the cube shaped portion is not. The operations of block 615, therefore, increase cross-sectional widths of the parallelpiped portion, but not the cube shaped portion. In some embodiments only cross sectional widths considered too thin are increased. In some embodiments, however, all cross sectional widths are increased, including, for example, the height of the parallelpiped portion.

After completing operations of block 615, the process returns.

Although the invention has been discussed with respect to various embodiments, it should be recognized that the invention comprises the novel and non-obvious claims supported by this disclosure.

What is claimed is:

1. A method, performed using at least one processor, useful in creation of a physical substantiation of a videogame character, comprising:
receiving a plurality of selections of visual features of a videogame character;
creating, by the at least one processor, a virtual model of a virtual game character using the plurality of selections of the visual features of the videogame character;
determining that a representation of the virtual model, comprising a virtual polygonal mesh, with adjacent polygons of the mesh sharing at least some common vertices or having boundaries that include vertices of adjacent polygons, defining an outer surface of the virtual game character, includes portions with a width below a predetermined minimum width; and
increasing the width of those portions of the representation of the virtual model with a width below the predetermined minimum width by displacing vertices of the virtual mesh of those portions in a direction to an average of a surface for polygons sharing a vertex;
forming a physical representation of the virtual game character using the representation of the virtual model with the increased widths.

2. The method of claim 1, wherein the virtual model of the virtual game character includes the virtual mesh defining the outer surface of the virtual game character, a rig defining bones of the virtual game character, with animations defined for animating the rig, and wherein the representation of the virtual model includes information of the virtual mesh defining the outer surface of the virtual game character, but not the rig or animations.

3. The method of claim 2, further comprising resizing the representation of the virtual model of the virtual game character to fit within a predefined envelope, prior to determining that the representation of the virtual model includes portions with a width below the predetermined minimum width.

4. The method of claim 1, wherein determining that the representation of the virtual model includes portions with a width below the predetermined minimum width includes determining internal ambient occlusion for the representation of the virtual model.

5. The method of claim 1, wherein determining that the representation of the virtual model includes portions with a width below the predetermined minimum width comprises:
determining internal ambient occlusion for the representation of the virtual model; and
for each of at least a plurality of surfaces of the representation of the virtual model, comparing an indication of the internal ambient occlusion with a value indicative of the predetermined minimum width.

6. The method of claim 1, wherein the physical representation is formed using a 3-D printer.

7. The method of claim 3, wherein the predefined envelope is in a shape of a cylinder.

8. The method of claim 3, wherein the predefined envelope is in a shape of a cylinder with a hemispherical top.

9. A system for use in creating a toy representative of a videogame character, comprising:
a server configured by program instructions to:
receive a plurality of selections of visual features of a videogame character;
create a virtual model of a virtual game character using the plurality of selections of the visual features of the videogame character;
determine that a representation of the virtual model includes portions with a width below a predetermined minimum width;
increase the width of those portions of the representation of the virtual model with a width below the predetermined minimum width;
wherein the program instructions for increasing the width of those portions of the representation of the virtual model with a width below the predetermined minimum width comprises program instructions to displace vertices of a virtual polygonal mesh, the virtual polygonal mesh defining polygons adjacent to one another, forming the representation of the virtual model in a direction normal to an outer surface of the model; and
export the representation of the virtual model with increased widths for 3-D printing.

10. The system of claim 9, further comprising a game device, the game device configured by program instructions to:
present a plurality of options for visual features of a game character on a display;
receive user inputs reflecting selections of at least some of the plurality of options; and
transmit information of the selections to the server.

11. The system of claim 10, further comprising a 3-D printer, to physically substantiate the representation of the virtual model.

12. The system of claim 9, wherein the program instructions for determining that the representation of the virtual model includes portions with a width below the predetermined minimum width comprises program instruction to:
determine internal ambient occlusion for the representation of the virtual model; and
for each of at least a plurality of surfaces of the representation of the virtual model, compare an indication of the internal ambient occlusion with a value indicative of the predetermined minimum width.

* * * * *